United States Patent
Handforth et al.

(10) Patent No.: US 7,466,985 B1
(45) Date of Patent: Dec. 16, 2008

(54) NETWORK ELEMENT FOR IMPLEMENTING SCHEDULED HIGH-POWER PTP AND LOW-POWER PTMP TRANSMISSIONS

(75) Inventors: Martin Ridgway Handforth, Kanata (CA); Anoop Nannra, Orleans (CA); John Stankus, Plano, TX (US); Larry Marcanti, Allen, TX (US); Brian Vezza, Allen, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 652 days.

(21) Appl. No.: 11/241,145

(22) Filed: Sep. 30, 2005

(51) Int. Cl.
 *H04Q 7/20* (2006.01)
(52) U.S. Cl. .................. 455/454; 455/450; 370/312; 370/352; 370/469
(58) Field of Classification Search .............. 455/422.1, 455/450, 502, 454, 466, 412.1, 432.1, 426.2, 455/403; 370/432, 312, 352, 390, 400, 401, 370/328, 338, 465–469, 321
See application file for complete search history.

(56) References Cited

U.S. PATENT DOCUMENTS

| | | | |
|---|---|---|---|
| 6,611,231 B2 | 8/2003 | Crilly, Jr. et al. | |
| 2002/0085537 A1* | 7/2002 | Carlsson et al. | 370/352 |
| 2002/0141355 A1 | 10/2002 | Struhsaker et al. | |
| 2002/0146980 A1 | 10/2002 | Solondz et al. | |
| 2002/0154622 A1 | 10/2002 | Hammel et al. | |
| 2003/0228865 A1* | 12/2003 | Terry | 455/422.1 |
| 2005/0147071 A1 | 7/2005 | Karaoguz et al. | |
| 2005/0169204 A1* | 8/2005 | Haumont et al. | 370/312 |
| 2005/0193309 A1* | 9/2005 | Grilli et al. | 714/752 |
| 2006/0069802 A1* | 3/2006 | Vedantham et al. | 709/233 |

OTHER PUBLICATIONS

Jim Geier, *802.16: A Future Option For Wireless MANs*, Wi-Fi Planet 2003 (4 pages).
Conniq.com, *Internet Access Guide: WiMAX* (3 pages).
Alvarion, *Wireless Video Surveillance*, 2003 (10 pages).
IEEE Std 802.16-2004, *Part 16: Air Interface for Fixed Broadband Wireless Access Systems*, pp. 1, 148-151, and 804.
R. Pabst, et al., *Relay-Based Deployment Concepts for Wireless and Mobile Broadband Radio*, IEEE Communications Magazine, Sep. 2004 (pp. 80-89).

(Continued)

*Primary Examiner*—Sujatha Sharma
(74) *Attorney, Agent, or Firm*—Anderson Gorecki & Manaras LLP

(57) ABSTRACT

A network element is configured to implement scheduled high-power Point-To-Point (PTP) and low-power Point-To-MultiPoint (TMP) transmissions. The high-power PTP and low-power PTMP transmissions may be scheduled as bursts on an 802.16 network to occur in both the downlink subframe and uplink subframe on a given frequency channel in the wireless network. The use of an air interface for both types of communications allows the PTP and PTMP communications to be scheduled relative to each other in a unified manner to increase quality of service and minimize interference between the backhaul PTP and access PTMP networks, even though the PTP and PTMP communications take place on the same channel using the same underlying wireless technology. Buffers may be used to store data received in a PTP downlink burst prior to transmission in a PTMP downlink burst, and may be used to store data received in an uplink PTMP burst prior to transmission in an uplink PTP burst.

9 Claims, 4 Drawing Sheets

OTHER PUBLICATIONS

K. Stanwood, et al., *Proposal to Add Point-to-Point Option to IEEE 802.16 MAC*, Jul. 2003, (4 pages).

Promax Security Cameras, advertising literature, (4 pages).

*Global, Interoperable Broadband Wireless Networks: Extending WiMax Technology to Mobility*, Intel Technology Journal vol. 8, Issue 3, Aug. 2004 (pp. 173-188).

White Paper, *WiMAX Technology and Deployment for Last-Mile Wireless Broadband and Backhaul Applications*, Fujitsu Microelectronics, Aug. 2004 (10 pages).

White Paper, *RF Spectrum Utilization in WiMAX*, Fujitsu Microelectronics, Nov. 2004 (9 pages).

S. Mukherjee, et al., *Throughput Range Tradeoff of Wireless Mesh Backhaul Networks*, Lucent (6 pages).

H. Wei, et al., *Interference-Aware IEEE 802.16 WiMax Mesh Networks*, IEEE Vehicular Technology Conference, Jun. 2005.

WiMax Forum, *WiMAX's technology for LOS and NLOS environments*, (10 pages).

A. Henley, 802.16 and WiMAX technology overview, Agilent Technologies, May 4, 2005 (55 pages).

Institute of Electrical and Electronics Engineers (IEEE) standard 802.16.2 (IEEE Std 802.16.2—2004), Mar. 17, 2004 (151 pages).

\* cited by examiner

NETWORK ELEMENT FOR IMPLEMENTING SCHEDULED HIGH-POWER PTP AND LOW-POWER PTMP TRANSMISSIONS

BACKGROUND OF THE INVENTION

1. Field of the Invention

The invention relates to wireless network elements and, more particularly, to a network element for implementing scheduled high-power Point To Point (PTP) and low-power Point To MultiPoint (PTMP) transmissions.

2. Description of the Related Art

Wireless data communication networks may include base stations, relay stations, subscriber stations, and other network devices, interconnected and configured to handle data as it passes through the network. These devices will be referred to herein as "network elements." In a wireless network, these network elements are interconnected by transmitting wireless signals in a portion of the electromagnetic spectrum.

When signals are transmitted wirelessly, the distance at which an RF signal may be received is often directly related to the amount of power used to transmit the signal and the directionality of the antenna. Accordingly, the amount of power that may be used to transmit data in the wireless spectrum is regulated in many jurisdictions. For example, in the United States, significantly more power may be used to transmit data for Point to Point (PTP) transmissions, which are limited to a maximum of up to 200 W EIRP in the downlink direction, than can be used for Point To MultiPoint (TPMP) transmissions, which are limited to a maximum of 4 W EIRP in the downlink direction. Limitations on the amount of power help prevent interference between adjacent regions in the wireless network and between wireless networks operated by different companies.

One emerging wireless protocol that may be used to transmit data between network elements is specified in Institute of Electrical and Electronics Engineers (IEEE) standard 802.16. The 802.16 standard can be used to create PTP or PTMP links with channel sizes that range from about 1.25 to 20 MHz, which enables the WiMax implementation of the 802.16 standard to provide T1 and higher data rates. 802.16 specifies three different physical layers—256-point FFT Orthogonal Frequency Division Multiplexing (OFDM), single carrier, and 2048 Orthogonal Frequency Division Multiple Access (OFDMA) modes. Of these three, only 256 OFDM has been accepted globally and, hence, is the preferred physical layer. One embodiment of the 802.16 standard that uses this accepted interface is commonly referred to as WiMax (Wireless Interoperability for Microwave Access). Although the term WiMax is used commonly to refer to an implementation of the 802.16 standard that uses the accepted physical layer, the term WiMax will be used more expansively in this document to refer to any implementation of the 802.16 standard.

The 802.16 standard divides time into frames, with each frame containing a downlink subframe and an uplink subframe. FIG. 1 shows graphically the frame structure set forth in the 802.16 protocol. Specifically, the frame 200 includes a downlink subframe 210 and an uplink subframe 220. The downlink subframe includes an header 230 containing information that will allow the subscriber stations to synchronize with the base station. For example, the header 230 contains an idle interval 231, a preamble 232 formed of two symbols, a Frame Control Header (FCH) 234 formed of two symbols, and both a downlink map 236 and an uplink map 238.

The downlink and uplink subframes are divided into time slots referred to as bursts that may be assigned to the subscriber stations using a number of different scheduling mechanisms. Generally, a base station will perform centralized scheduling although the standard also supports decentralized scheduling when the network elements are used to implement a mesh network topography. Once the burst are scheduled (either centrally or in a decentralized manner), the subscriber stations will be notified of their allocated downlink burst(s) in the DL map 236 and will be notified of their allocated uplink burst(s) in the UL map 238. Additional details associated with the physical and Media Access Control specification may be found in the 802.16 specification, the content of which is hereby incorporated herein by reference. To enable a subscriber station to communicate with the base station, the subscriber station will listen to the carrier frequency during its allotted DL burst, and will transmit on the carrier frequency during its allotted UL burst.

Within a time-slot (or link to a particular subscriber) WiMax enables the transmission characteristics to be optimized for that link. For example, WiMax enables each subscriber's data rate to be optimized by allowing the base station to set modulation schemes on a link-by-link basis. A subscriber close to the base could use 64QAM (Quadrature Amplitude Modulation), while a weaker signal from a more remote subscriber might use a different modulation scheme such as 16QAM or Quadrature Phase Shift Keying (QPSK). These choices may be made for both the uplink direction (from the subscriber to the base station) and downlink direction (from the base station to the subscriber).

Additionally, WiMax allows the power level to be adjusted on a link-by-link basis so that the amount of power required to be transmitted by the subscriber stations in an uplink direction may be minimized. Power control, in this instance, relates to the amount of power used by the subscriber station, and is implemented by causing the base station to send power control information to each of the subscriber stations to allow the subscriber station to use the least amount of power required to transmit data to the base station.

Often it would be advantageous to connect the base station with the core network using wireless transmissions rather than a physical link. For example, deploying a copper or optical cable is relatively difficult and, hence expensive, as compared to the relative ease with which a wireless link may be established interconnect the base station with the core network. Additionally, when the base station is mobile, base station it is not possible to use fixed wireline access to provide a backhaul connection between the base station and the fixed wireline network. Accordingly, it would be advantageous to provide a network element that would be able to operate simultaneously on the backhaul and the access portions of a wireless communication network.

SUMMARY OF THE INVENTION

The present invention provides a network element for implementing scheduled high-power Point To Point (PTP) and low-power Point To MultiPoint (PTMP) transmissions. According to an embodiment of the invention, a network element is provided that has both high-power Point To Point (PTP) and low-power Point To MultiPoint (PTMP) antennas that may be used to transmit data in scheduled bursts on a given frequency channel in a wireless network. The network element is provided with an air interface that is configured to transmit data on both PTP links and PTMP links to enable both high-power backhaul and low-power access bursts to be scheduled on the network. The use of an air interface for both types of communications allows the PTP and PTMP communications to be scheduled relative to each other in a unified manner so that interference between the backhaul PTP and access PTMP networks may be minimized even though the PTP and PTMP communications to take place on the same RF frequency channel and according to the same underlying wireless technology.

Those skilled in the art will appreciate the scope of the present invention and realize additional aspects thereof after reading the following detailed description of the preferred embodiments in association with the accompanying figures.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labelled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 2:
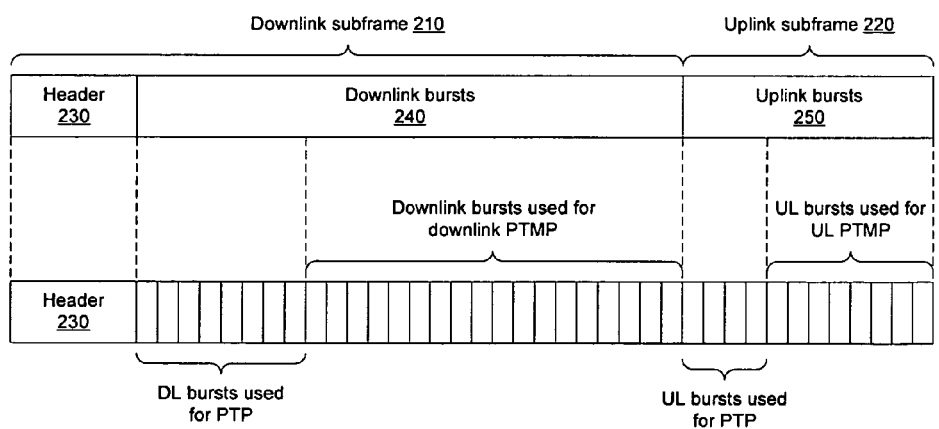
FIG. 2 is a representative diagram of a frame formatted according to the 802.16 standard but carrying PTP and PTMP data for use with a network element configured according to an embodiment of the invention.

FIG. 2 is a representative diagram of a frame format formed according to the 802.16 standard that may be used to transmit PTP and PTMP communications via a network element according to an embodiment of the invention. As shown in FIG. 2, the frame includes a downlink subframe 210 and an uplink subframe 220, containing timeslots to carry downlink bursts 240 and timeslots to carry uplink bursts 250. The downlink bursts may be scheduled to include PTP bursts in the downlink direction, PTMP bursts in the downlink direction, PTMP bursts in the uplink direction, and PTP bursts in the uplink direction. The bursts may be scheduled to occur on the same frequency channel, via a network element having the capability to implement both the PTP and PTMP communi-cations, so that the high-power PTP and low-power PTMP aspects may be implemented on in a scheduled manner.

Figure 3:
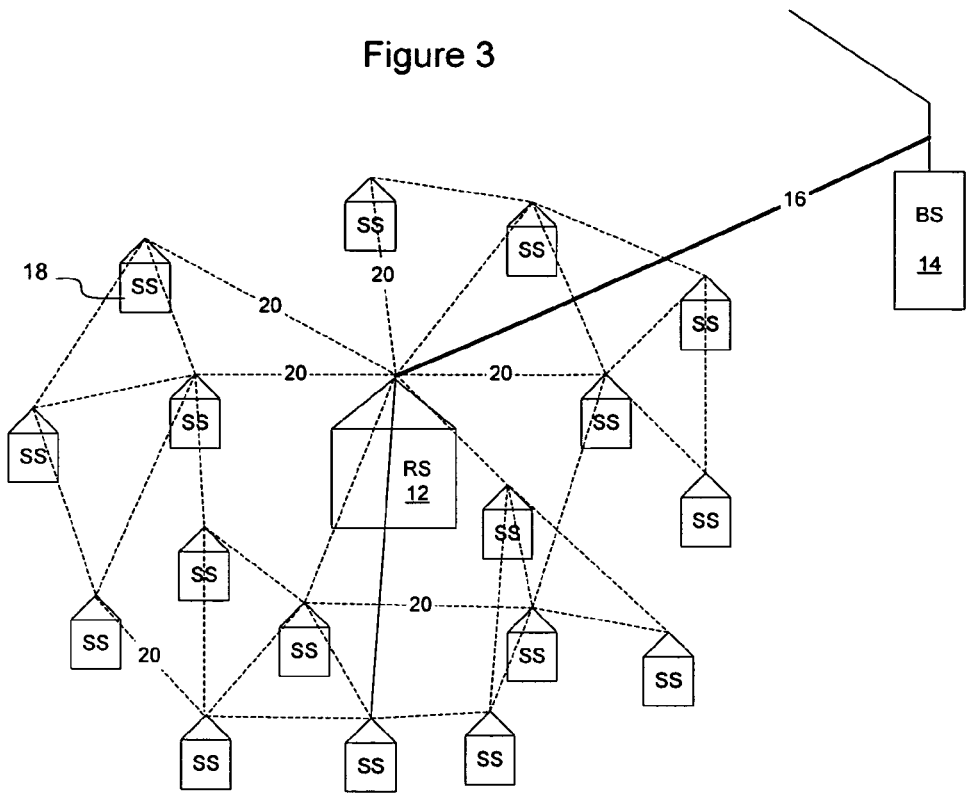
FIG. 3 is a functional block diagram of an example of a region in a wireless network in which scheduled PTP and PTMP communications are enabled to take place over the same frequency channel via a network element configured according to an embodiment of the invention.

FIG. 3 illustrates an example wireless communication network in which a network element 12 is configured to inter-connect with a base station 14 over a high-power PTP link 16 and to interconnect with subscriber stations 18 over low-power PTMP links 20.

High-power PTP links 12 are illustrated in the figures using thick solid lines while the low-power PTMP links 20 are illustrated using thin dashed lines. The network element, in this example network, may be implemented as a relay station to forward traffic received from the subscriber stations 18 over the PTMP links 20 to the base station 14 over the PTP link 16.

The subscriber stations 18 may communicate directly with the relay station 12 or, alternatively as illustrated, may be configured in a mesh network topology in which communications may pass between subscriber stations 18 before arriving at the relay station 12. The relay station 12 and subscriber stations 18 may be mobile or stationary, depending on the particular implementation.

Figure 4:
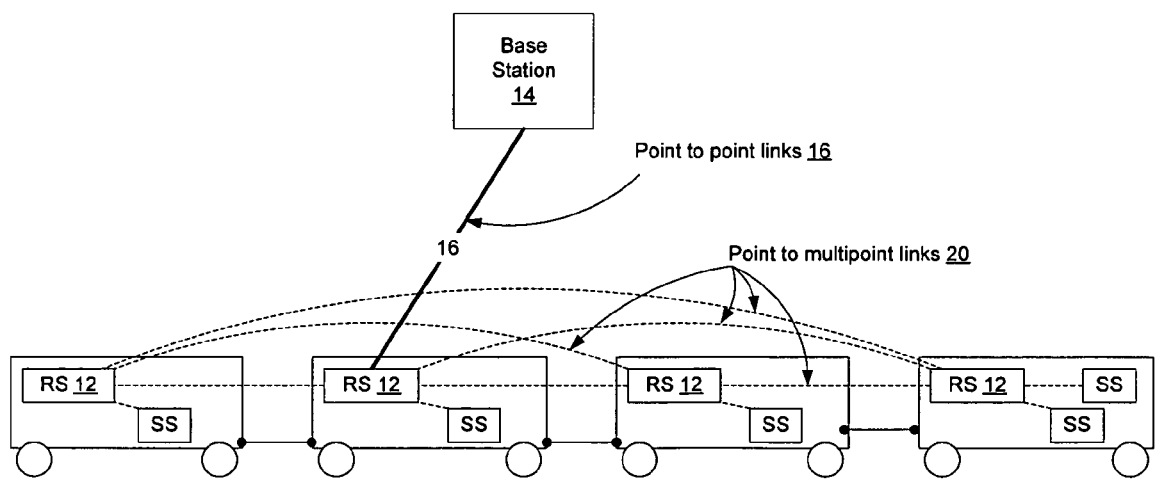
FIG. 4 is a functional block diagram of a train forming a network region containing a network element configured according to an embodiment of the invention.

FIG. 4 illustrates, as an example, a train containing a network element formed as a relay station and configured to handle both high-power PTP communications with a base station 14 and to handle low-power PTMP communications with subscriber stations on the train. Communications on the PTP links 16 and PTMP links 20 may be scheduled to occur during different times but on the same RF frequency channel. Although a single relay station on the train is illustrated as implementing the backhaul link 16, the train may have multiple network elements configured to communicate in both a high-power PTP and low-power PTMP manner. For example, each subscriber station may have an air interface configured to enable it to assume both modes of communication. In this example, the manner in which the particular network element is selected to implement both modes of communication may be selected according to which has best signal, which has available capacity, the locus of the adjoining subscriber stations within the mesh to minimize the number of hops in the PTMP mesh network, or according to another criteria. The invention is not limited to the particular manner in which a particular network element is selected to be used to implement both modes of communication.

According to an embodiment of the invention, the network element is configured to implement the high-power PTP wireless links 16 and the low-power PTMP links 20 using one of the 802.16x protocols. More preferably, the links are formed using the WiMax implementation of the 802.16x protocol. Additional details about how communication between the network elements may occur at different time slots over the same RF frequency channel are provided below in connection with FIG. 5.

Any scheduling mechanism, such as one of the several defined scheduling mechanisms set forth in the 802.16 standard, including both centralized scheduling and distributed scheduling, may be used to schedule the PTP and PTMP time slots. Since the scheduling mechanisms are, themselves, well known, a detailed description of the particular way in which each scheduling mechanism operates has been omitted.

The frame format illustrated in FIG. 2 enables some of the time slots i.e. one or more of the time slots (from either the downlink subframe, uplink subframe or both uplink and downlink subframes) to be used to transmit data on PTP links and other time slots to be used to implement PTMP links. The timeslots that are used to implement the PTP links are reserved and not allocated to subscriber stations. The reservation may be included in the downlink map 236 and uplink map 238 so that the subscriber stations know not to expect to receive or use the PTMP channel during those reserved timeslots.

As shown in FIG. 2, the downlink subframe includes downlink PTP timeslots used to transmit data from the base station to the relay station over the PTP link 16, and includes downlink PTMP timeslots that may be used by the relay station to transmit data received over the PTP link to the subscriber stations over PTMP links. Similarly, the uplink subframe includes uplink PTMP time slots which are allocated to the subscriber stations as needed to enable data to be transmitted from the subscriber stations to the relay station. The uplink subframe also includes uplink PTP time slots over which the relay station may transmit data received on the uplink PTMP timeslots to the base station over the high-power PTP link 16. Assignment of the downlink PTP and PTMP, and uplink PTP and PTMP timeslots is performed by the base station (in a centralized scheduling system. When a decentralized scheduling system is used, for example in a mesh context, the timeslots will be scheduled in a decentralized manner. The invention is not limited to the use of a particular type of scheduling algorithm as any scheduling mechanism may be used to schedule the time slots, and the network element according to an embodiment of the invention will enable the coordinated scheduling to occur on both the PTP and PTMP links.

The number of timeslots allocated to the PTP downlink and PTP uplink may depend on the amount of data to be received by the network element on the PTP link, the amount of data to be transmitted by the network element on the PTP link, and the bandwidth of the PTP link. In the illustrated embodiment, the frame has been broken up so that there are an asymmetric number of downlink timeslots, particularly twice as many downlink timeslots as there are uplink timeslots. Additionally, it has been assumed that the bandwidth on the PTP link would be twice as high as it is on the PTMP links. Accordingly, half as many downlink and uplink timeslots have been reserved for use by the network element to implement the PTP link as are allocated by the network element to the subscriber stations. The invention is not limited in this manner as the particular way in which the timeslots are allocated may depend on the particular implementation, network conditions i.e. which way traffic is flowing, and the link speeds involved.

Scheduling of timeslots in an 802.16 network occurs dynamically as data needs to be transferred. The 802.16 standard specifies the mechanism by which the subscriber stations may be allocated timeslots and through which the subscriber stations may request timeslots from the base station. According to an embodiment of the invention, these same mechanisms may still be utilized to handle communications between the base station and the subscriber stations. The time slot allocations by the base station to the subscriber stations may still be communicated via the downlink map 236 and uplink map 238 as has been done in conventional 802.16 implementations. However, the overall bandwidth between the base station and subscriber stations is reduced by a particular amount, which may vary depending on the particular manner in which the PTP link is implemented between the base station and the relay station, to enable the base station to reserve a portion of the timeslots to implement the PTP backhaul network. Thus, once the base station determines how many time slots will be required for the PTP link, it schedules the remaining uplink and downlink timeslots for use for PTMP communications between the relay station and the subscriber stations, or between subscriber stations and other subscriber stations (in a mesh implementation).

Figure 1:
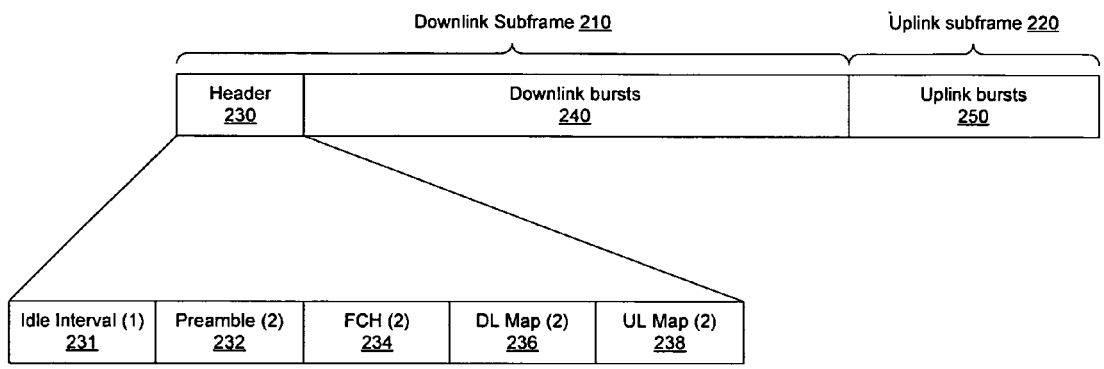
FIG. 1 is a representative diagram of a data frame format according to the 802.16 standard.

The network element forming the relay station in FIG. 1 or FIG. 2, according to an embodiment of the invention, will be implemented to include a buffer to temporarily store data received on the uplink PTMP timeslots pending transmission on the uplink PTP timeslots and to temporarily store data received on the downlink PTP timeslots pending transmission on the downlink PTMP timeslots. FIG. 2 illustrates the downlink PTP timeslots occurring before the downlink PTMP timeslots and illustrates the uplink PTMP timeslots occurring before the uplink PTP timeslots to minimize the buffering requirements of the network element 12. The invention is not limited in this manner as other scheduling may be preferable depending on the implementation.

The network element, optionally, may include separate uplink and downlink buffers to allow differential scheduling to occur. Specifically, in this embodiment, as the uplink network buffer fills with traffic received over the PTMP uplink time slots, the relay station may request that more of the uplink timeslots be used as uplink PTP timeslots so that the uplink buffer may be emptied faster. Scheduling more uplink timeslots to be used to transmit data on the uplink PTP time slots increases the backhaul capacity while reducing the amount of data being received by the base station from the subscriber stations. Thus, this will tend to cause the uplink network buffer to empty.

Similarly, as the downlink buffer fills, the relay station may request that more of the downlink time slots be allocated to PTMP downlink transmissions and fewer of the downlink time slots be allocated to PTP downlink transmissions, to cause the rate at which data is received at the relay station to be reduced while increasing the rate at which the relay station may output data to the subscriber stations. By implementing the relay station as an integrated PTP and PTMP communication device, it is possible to coordinate scheduling of PTP and PTMP transmissions. Additionally, by providing an integrated PTP and PTMP communication device, it is possible to balance the amount of bandwidth on the PTP and PTMP links to provide enhanced quality of service and reduced jitter to traffic flowing from the base station to the subscriber stations.

Figure 5:
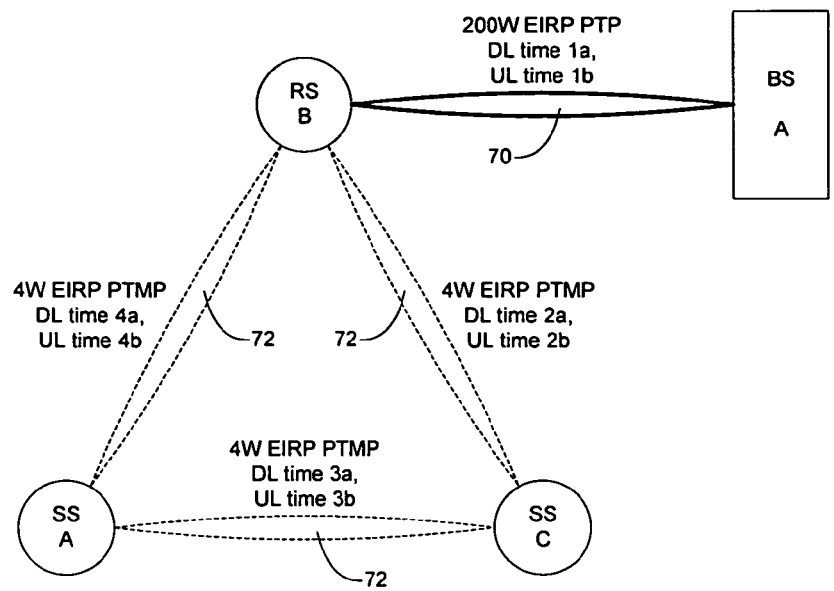
FIG. 5 illustrates scheduling of PTP and PTMP power between base stations and fixed network access according to an embodiment of the invention.

FIG. 5 illustrates graphically an example of scheduling of PTP and PTMP power differentiated transmissions over the same RF frequency channel through a network element according to an embodiment of the invention. Initially, the base station A will broadcast the header 230 to all of the network elements on the wireless network. The header will synchronize the network elements and provide the mapping to the network elements so that the network elements B-D know which time slots have been allocated to which network element. In the following example, timeslot 1 has been allotted to implement the PTP transmissions and timeslots 2-4 have been allotted for PTMP transmissions.

As shown in FIG. 5, during time slot 1, a high-power 200 W Effective Isotropic Radiated Power (EIRP) PTP channel is established between the base station A and the relay station B. The relay station B is configured, according to an embodiment of the invention, to be configured to implement both PTP and PTMP transmissions. The PTP channel 70 may be used to transmit data in both the uplink and downlink directions. For example, a first timeslot of the downlink subframe (time slot 1a) may be used to transmit data in the downlink direction from A to B, and a first timeslot of the uplink subframe (time slot 1b) may be used to transmit data in the uplink direction from B to A. More than one timeslot may be allocated, different timeslots may be allocated, and different sized timeslots may be allocated depending on the particular traffic patterns on the network.

In the example of FIG. 5, a time slot is also provided to each of the other network elements B, D, to communicate with each other and with the relay station B. Specifically, low-power PTMP channels 72 are scheduled to be established in both the uplink and downlink subframes between the relay station B and subscriber station C during time slot 2 in each subframe, between subscriber station C and subscriber station D during time slot 3 in each subframe, and between subscriber station D and relay station B during time slot 4 in each subframe. As shown in FIG. 5, the low-power PTMP channels 72 in this embodiment are 4 W EIRP PTMP channels with a maximum power significantly less than the PTP channel 70. Optionally, in the uplink direction, the EIRP on the channel may be increased depending on the particular regulations governing link power.

There are several different antenna technologies that may be used to separate transmission of signals or improve special spectral efficiencies and robustness or other characteristics when forming the PTP and PTMP transmissions. For example, in one embodiment, omni-directional antennas may be used to implement the PTMP communications and beam forming or directional antennas may be used in connection with the PTP communications. Several well known types of antennas, such as Multiple In Multiple Out (MIMO) antennas and X-sector antennas may be advantageously used in connection with embodiments of the invention, although the invention is not limited to the use of one of these particular types of antenna technologies.

Figure 6:
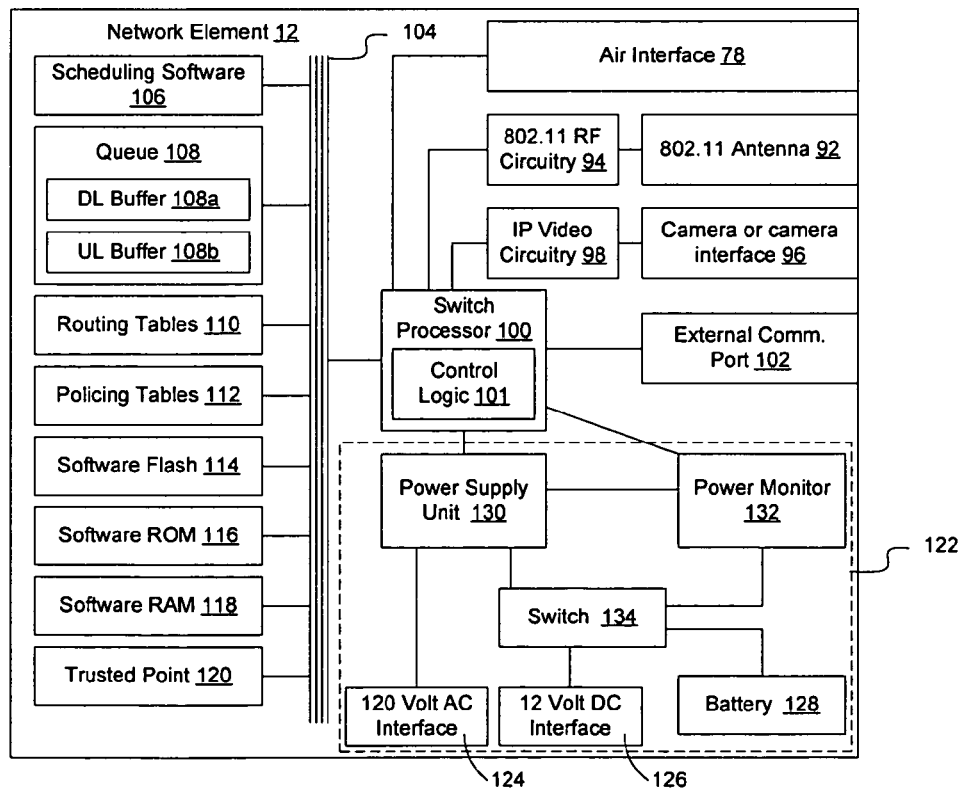
FIG. 6 is a functional block diagram of a network element according to an embodiment of the invention.

FIG. 6 illustrates a network element 12 configured to include implement synchronized scheduling of high-power PTP and low-power PTMP wireless signals in the same RF frequency band according to one embodiment of the invention. The network element may be implemented as a relay station, as shown in FIGS. 3-5, as a base station, or as another network element configured to implement both PTP and PTMP signals on a wireless communication network. Other network element architectures may be used as well and the invention is not limited to an embodiment that is implemented in the same manner as the example shown in FIG. 6. The network element shown in FIG. 6 is configured to implement the WiMax implementation of the 802.16 standard, although other embodiments may be configured to implement other wireless protocols.

As shown in FIG. 6, the network element 2 includes an air interface 78 containing one or more antennas configured to receive and transmit signals in the RF frequency band that will be used for both high-power PTP and low-power PTMP communications. Additional details associated with three example air interfaces will be provided below in connection with FIGS. 7-9.

The network element 12 may also include other interfaces, such as a wireless interface configured to enable the network element 12 to receive and transmit communications using another protocol. For example, in the embodiment illustrated in FIG. 6, the network element 12 includes a wireless LAN interface such as an 802.11 antenna 92 and 802.11 RF circuitry 94.

The network element 12 may also include the capability to directly receive IP video. Video surveillance is becoming increasingly widespread and it is anticipated that video surveillance will be even more prevalent as camera networks are deployed. According to an embodiment of the invention, the network element 12 may be provided with a camera or camera interface 96 and appropriate IP video circuitry 98 to enable the signals received from the camera to be packetized for transmission on the network. Where packetization is performed by the camera, the camera interface may be formed as a standard Ethernet interface.

The network element 12 may also include one or more external communication ports 102, such as one or more Ethernet (10baseT, 100baseT, 1000baseT, 10baseF, 100baseFX) or Universal Serial Bus (USB) ports, to enable the network element 12 to be connected to fixed network resources or to a management terminal. Other communication ports may be included as well and the invention is not limited to an embodiment that has only the several described ports.

Signals received by the network element 12 or to be transmitted by the network element 12 are switched internally using a switch processor 100. The switch processor may be an internet protocol (IP) switch processor or a switch processor configured to implement another protocol. For example, the switch processor may perform MAC level switching rather than IP routing.

The switch processor is connected to an expansion bus 104, such as a Peripheral Control Interconnect (PCI) bus, although the invention is not limited to the use of a particular type of expansion bus. The expansion bus 104 connects the switch processor 100 with various resources, such as storage resources that may be configured to store information temporarily or permanently on the base station 18.

Transmission of data over PTP and PTMP timeslots may require the network element to maintain a schedule or participate in timeslot scheduling. According to an embodiment of the invention, scheduling software 106 may be provided to enable the network element 12 to participate in scheduling transmissions over the various available media. The scheduling software may be configured as a separate piece of code or, alternatively where scheduling is performed according to one of the wireless standards, may be integrated with the protocol stack configured to implement the wireless protocol.

Where data is scheduled to be handled by the network element 12 on both the PTP and PTMP timeslots, it may be necessary to buffer the data temporarily while waiting for the timeslot to occur. To accommodate this data, the network element 12 may include a queue 108 that is configured to store data until it is able to be processed and/or transmitted by the network element. Since the high-power PTP communication that is used to form the backhaul network will only operate during particular time intervals, data received over the low-power PTMP communication links will need to be stored by the network element pending uplink transmission over the PTP backhaul link. Similarly, when data is received over the high-power PTP link and is to be transmitted over the low-power PTMP link, the data will need to be buffered in the downlink direction. To enable the data to be separated, the queue may be logically or physically divided into two buffers, a downlink buffer 108a and an uplink buffer 108b, to allow individual control to be exerted over the data flows in the uplink and downlink directions. Ways of managing the fill rate of the uplink and downlink buffers by affecting scheduling on the PTP and PTMP links are described in greater detail above.

The queue 108, may be any standard data queue or data storage facility. Optionally, the data may be passed directly to the queue from the RF circuitry using direct memory access facilities (not shown) to reduce congestion on the expansion bus 104. The invention is not limited to the particular manner in which the queue is configured.

Another slot on the expansion bus may be connected to a storage area containing routing tables 110. The switch processor will typically access the routing tables when ascertaining how to handle a received protocol data unit. The routing tables, in this embodiment, may be used to keep track of which IP addresses are reachable through the network element 12, and over which port a particular packet should be directed to send the packet to the intended recipient. The routing table may be implemented as a Forwarding Information Base, Routing Information Base, or other common data structure configured to enable the switch processor 100 to determine whether a packet should be forwarded and, if so, to determine which interface should be used to forward the packet.

Another slot on the expansion bus may be occupied by a memory module containing policing tables 112, for example configured to store filter rules for implementation on the network element 12. It may be desirable to filter traffic received over the PTMP links and/or PTP links to prevent a portion of that traffic from being further transmitted on the wireless network. Several reasons for doing this may be to block access to a network user that has not established an account with the network operator, to block access to a network user that has an outstanding balance with the network operator, or to block access to a network user who has abused the network access privileges in some way, for example by sending an excessive amount of traffic or undesired/unsolicited e-mail traffic (Spam).

The policing tables may include a list of blocked IP addresses, source or destination MAC addresses, and/or other types of information such as port/protocol and L5 VPN data associated with the traffic. For example, a network operator may determine that a network user is generating an inordinate amount of Spam traffic, and may determine that the network user should not be allowed to send e-mail messages on the network. However, the network operator may still wish to provide network access to the network user to allow the network user to continue to access resources and receive e-mail over the network. The policing tables, in this example, may include a rule indicating that e-mail traffic generated by a particular IP address or MAC address should not be forwarded by the base station over the PTP links. Thus, the relay station may form a first-line firewall to prevent undesired traffic from entering the network and to provide a policy implementation point where filter rules may be applied to traffic.

In addition to rules pertaining to individual users, the policing tables may be configured to include general policy rules, such as a rule that an emergency message such as a "911" message will always be forwarded regardless of whether the network user generating the emergency message does not have an account or is otherwise blocked from issuing traffic on the network. Other policy rules and filter rules may be implemented in the policing tables and the invention is not limited to any particular policing rules.

Several additional memory modules may also be connected to the expansion bus. For example, a flash memory chip 114 may be attached to a slot on the expansion bus and configured to hold software and state information to be used by the switch processor in connection with boot operations of the network element 12. For example, the flash memory chip may be configured to hold default instructions as well as state information associated with programs, communication sessions, and network users, that may have been using the resources provided by the network element 12 prior to the event which caused the need for the base station to undertake a boot process. The flash memory may also contain initial instructions pertaining to operations the base network element should take in connection with any instantiated handshake protocols on the network. The invention is not limited to any particular type of information stored in the flash memory.

A Read Only Memory (ROM) 116 and a Random Access Memory (RAM) 118 may also be provided to store information, such as data and instructions, for execution on the switch processor. The RAM and ROM may be formed using any standard memory technology and the invention is not limited to any particular type of memory technology. The RAM and ROM may be used to store state information associated with flows through the network, software to be utilized by the switch processor in connection with processing protocol data units received over the links, and any other convenient data or instructions.

In the embodiment shown in FIG. 6, the network element 12 also includes trusted point software 120 containing one or more secure and trusted agents associated with the network or one or more network service providers. A network agent is a secure and trusted agent of the service providers, and is not accessible for manipulation by the subscriber or the other software programs running on the network element. The trusted point software provides a secure environment in which applications may be started, so that service providers may safely run applications on the network element 12 with the assurance that they are not being compromised to operate in an insecure manner. For example, a service provider may cause an agent to run in the secure environment established by the trusted point to monitor flows of traffic on the network. Customer premise equipment containing an environment to support network agents is described in greater detail in U.S. patent application Ser. No. 11/200,603, filed Aug. 10, 2005, and entitled Network Controlled Customer Service Gateway For Facilitating Multimedia Services Over A Common Network, the content of which is hereby incorporated herein by reference.

When the network element 12 is implemented to include a trusted point 120, the platform may be secured to allow service provider code to perform network monitoring, quality of service, and other network functions. Additionally, the trusted point may allow the network element 12 to report the presence of any unsafe environment, such as if the network element 12 has been tampered with. This feature enables the network element 12 to notify the network manager and optionally implement remedial action, such as for example causing traffic to be routed around the compromised network element. For example, if the network element is deployed as a relay station on a train, as shown in FIG. 4, the trusted point may allow the network operator to be notified if any one of the relay stations is inaccessible. Where the relay stations are to convey IP video surveillance data to the network operator, the trusted point may allow the video data to be routed around the failing relay station to allow continued access to the video data. Many other examples may be considered as well and the invention is not limited to this particular application of the trusted point in a train environment.

Other memory modules may be connected to the expansion bus 100, such as a log module or removable memory resource, and the invention is not limited to a network device implementing only the illustrated resources.

The network element 18 also includes a power provision and regulation section 122 configured to monitor power levels available to the network element 18 and control operation of the network element 18 as necessary. In the illustrated embodiment, the power provision and regulation section includes an interface to 120 volt AC power 124, an interface to 12 volt DC power 126, a battery 128, a power supply unit 130, a power monitor 132, and a switch 134. Additional details associated with operation of the power provision and regulation section is contained in U.S. patent application Ser. No. 10/678,703, filed Oct. 3, 2003, entitled Method And Apparatus For Providing Mobile Inter-Mesh Communication Points In A Multi-Level Wireless Mesh Network, the content of which is hereby incorporated herein by reference. The invention is not limited to an embodiment having a power provision and regulation section configured as illustrated in FIG. 6.

The air interface 78 contains RF circuitry and one or more antennas to enable PTP and PTMP signals to be received and transmitted by the network element. Analog/digital signals received over the air interface 78 are received by one or more than one antenna, processed by the RF circuitry, and passed to the switch processor 100. Similarly, signals to be transmitted from the network element are received by the RF circuitry associated with the air interface, processed to be converted to a format suitable for transmission, and passed to the antennas for either PTP or PTMP transmission.

Figure 7:
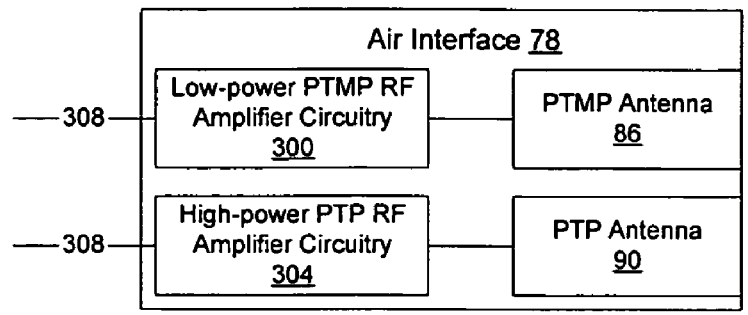
FIGS. 7-9 are functional block diagrams of alternate air interfaces that may be used in the base station of FIG. 6 according to embodiments of the invention.
Figure 8:
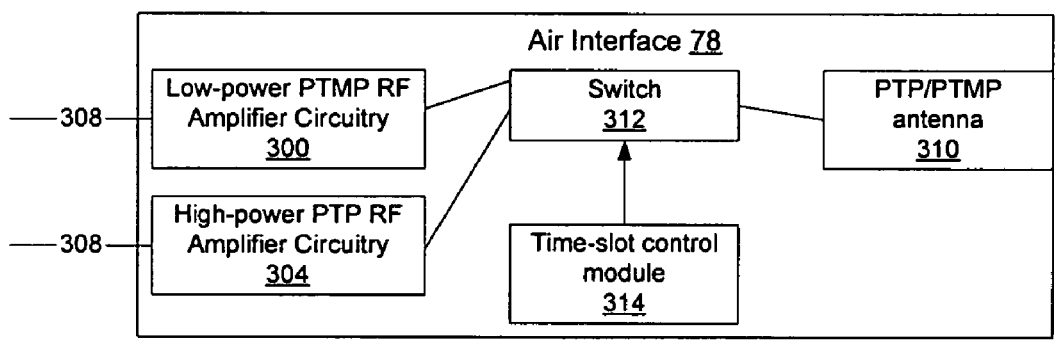
Figure 9:
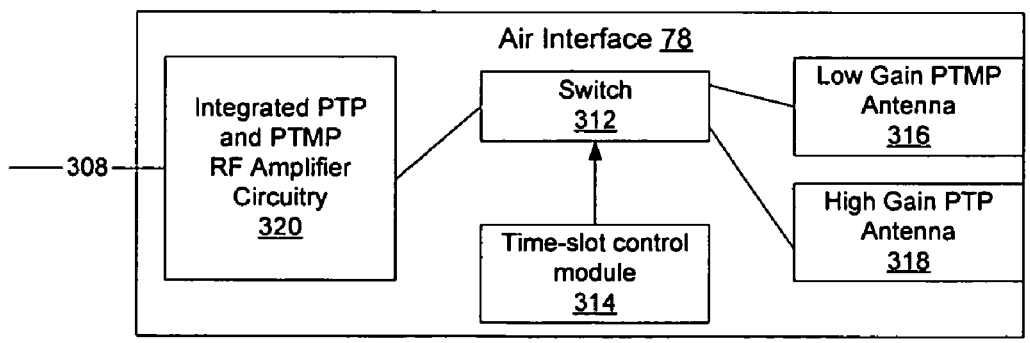

FIGS. 7-9 show three example air interfaces that may be used in connection with an embodiment of the invention. A first embodiment, illustrated in FIG. 7, shows an air interface 78 that includes a low-power PTMP RF amplifier circuitry 300 connected to a low-gain PTMP omni-directional antenna 302. The air interface 78 also includes a high-power PTP RF amplifier circuitry 304 connected to a high-gain PTMP directional antenna 306. The air interface is connected via two links 308 to the switch processor 100 so that the switch processor can switch data to be transmitted out over either the PTMP antenna or PTP antenna.

FIG. 8 shows another embodiment of an air interface 78 in which a single antenna 310 is connected by a switch 312 to both the low-power PTMP RF amplifier circuitry 300 and the high-power PTP RF amplifier circuitry 304. A time slot control module 314 may be provided to control the switch to enable the antenna to be selectively connected to one of the RF amplifier circuits 300, 304. Alternatively, as with the first embodiment shown in FIG. 7, the air interface 78 may be connected via two links 308 to the switch processor to enable the switch processor to control whether the data is transmitted over the PTMP or PTP antenna.

FIG. 9 illustrates another embodiment of an air interface 78 in which two antennas, a low-gain omni-directional PTMP antenna 316 and a high-gain directional PTP antenna 318 are used to transmit data during the PTMP and PTP timeslots. The RF signal for transmission over the PTP and PTMP timeslots is provided by unified RF amplifier circuitry 320. A switch 312 controlled by a time-slot control module 314 is provided to selectively interconnect the RF amplifier circuitry 320 with either the low-gain omni-directional PTMP antenna 316 or high-gain directional PTP antenna 318, depending on whether the data is to be transmitted in a PTMP or PTP timeslot.

It should be understood that all functional statements made herein describing the functions to be performed by the methods of the invention may be performed by software programs implemented utilizing subroutines and other programming techniques known to those of ordinary skill in the art. Alternatively, these functions may be implemented in hardware, firmware, or a combination of hardware, software, and firmware. The invention is thus not limited to a particular implementation.

The software described herein may be implemented as a set of program instructions that are stored in a computer readable memory associated with the network element and executed on a microprocessor such as switch processor 100 within the network element. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A network element for implementing scheduled high-power point-to-point (PTP) and low-power point-to-multipoint (PTMP) transmissions, comprising:
   an air interface configured to transmit and receive both PTP and PTMP transmissions on a given RF channel,
   a switch processor containing control logic configured to:
      enable the network element to receive a schedule containing scheduling information for downlink PTP transmissions, downlink PTMP transmissions, uplink PTMP transmissions, and uplink PTP transmissions;
      enable the network element to cause first data to be received over the air interface during the scheduled downlink PTP transmissions and to cause second data to be received over the air interface during the scheduled uplink PTMP transmissions; and
      enable the network element to cause the first data to be transmitted over the air interface during the scheduled downlink PTMP transmissions and to cause the second data to be transmitted over the air interface during the scheduled uplink PTP transmissions.

2. The network element of claim 1, further comprising a queue configured to store the first data after being received over the air interface and prior to being transmitted over the air interface, and further configured to store the second data after being received over the air interface and prior to being transmitted over the air interface.

3. The network element of claim 2, wherein the queue comprises a downlink buffer configured to store the first data and an uplink buffer configured to store the second data, wherein the first and second buffers are logically or physically separate.

4. The network element of claim 1, wherein the network element further comprises a trusted point configured to enable applications to be started in a secure manner on the network element.

5. The network element of claim 1, wherein the scheduled downlink PTP transmissions and scheduled downlink PTMP transmissions are scheduled as bursts in a downlink subframe, and wherein the scheduled uplink PTP transmissions and scheduled uplink PTP transmissions are scheduled as bursts in an uplink subframe, said downlink subframe and uplink subframe comprising two parts of a transmission frame in a wireless protocol.

6. The network element of claim 5, wherein the schedule containing scheduling information for downlink PTP transmissions, downlink PTMP transmissions, uplink PTMP transmissions, and uplink PTP transmissions; is transmitted as a part of a header of said transmission frame.

7. The network element of claim 1, wherein the air interface comprises:
- a low-power PTMP RF amplifier circuit connected to the switch processor,
- an omni-directional PTMP antenna connected to the low-power PTP RF amplifier circuit;
- a high-power PTP RF amplifier circuit connected to the switch processor; and
- a directional PTP antenna connected to the high-power PTP RF amplifier circuit.

8. The network element of claim 1, wherein the air interface comprises:
- a low-power PTMP RF amplifier circuit connected to the switch processor,
- a high-power PTP RF amplifier circuit connected to the switch processor;
- a dual-mode PTP/PTMP antenna configured to operate in either a high-power directional PTP mode or a low-power omni-directional PTMP mode;
- a switch having a first input connected to the low-power PTMP RF amplifier circuit and a second input connected to the high-power PTP RF amplifier circuit, and an output connected to the dual-mode PTP/PTMP antenna; and
- a time-slot control module configured to operate the switch to enable the dual-mode PTP/PTMP antenna to be alternately connected to the low-power PTMP RF amplifier circuit and the high-power PTP RF amplifier circuit according to the schedule.

9. The network element of claim 1, wherein the air interface comprises:
- integrated PTP and PTMP RF amplifier circuitry connected to the switch processor;
- a low-gain omni-directional PTMP antenna;
- a high-gain directional PTP antenna;
- a switch having an input connected to the integrated PTP and PTMP RF amplifier circuitry, a first output connected to the low-gain omni-directional PTMP antenna and a second output connected to the high-gain directional PTP antenna; and
- a time-slot control module configured to operate the switch to enable the i integrated PTP and PTMP RF amplifier circuitry to be alternately connected to the low-gain omni-directional PTMP antenna and the high-gain directional PTP antenna.

* * * * *